United States Patent [19]

Malin

[11] Patent Number: 4,774,405
[45] Date of Patent: Sep. 27, 1988

[54] REAL TIME AUTOCOLLIMATOR DEVICE FOR ALIGNING TWO SURFACES IN PARALLEL

[75] Inventor: Mark Malin, Saratoga, Calif.

[73] Assignee: The United States of America as represented by the Secretary of the Air Force, Washington, D.C.

[21] Appl. No.: 53,986

[22] Filed: May 26, 1987

[51] Int. Cl.$^4$ .................................. G02F 1/01
[52] U.S. Cl. ................................. 250/225; 250/548; 356/152
[58] Field of Search ............... 250/225, 548, 561; 356/152, 400

[56] References Cited

U.S. PATENT DOCUMENTS

| | | | |
|---|---|---|---|
| 3,087,377 | 4/1963 | Daley | 356/225 |
| 3,470,377 | 9/1969 | Febre et al. | 356/152 |
| 3,871,771 | 3/1975 | Scott | 356/371 |
| 4,170,401 | 10/1979 | Yoder, Jr. et al. | |

*Primary Examiner*—Edward P. Westin
*Assistant Examiner*—Khaled Shami
*Attorney, Agent, or Firm*—Jules J. Morris; Donald J. Singer

[57] ABSTRACT

A real time autocollimator 10 for measuring parallelism of two surfaces 12, 14. The autocollimator uses a laser 16 to provide light to first and second beam splitters 20, 22. Second beam splitter 22 directs dissimilarly polarized light to each surface 12, 14. This light is reflected to, then recombined by the second beam splitter prior to being redivided by a third beam splitter for comparison at quadrant detectors 30, 32.

14 Claims, 1 Drawing Sheet

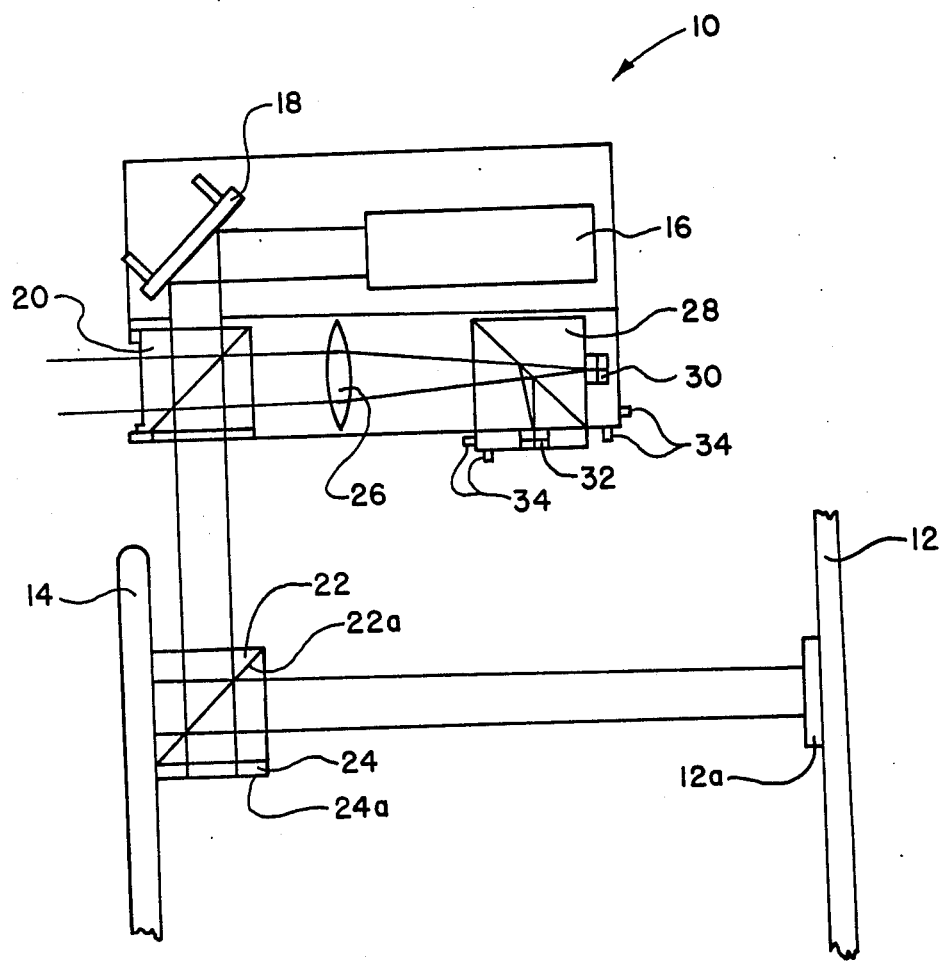

REAL TIME AUTOCOLLIMATOR DEVICE FOR ALIGNING TWO SURFACES IN PARALLEL

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of alignment and more specifically to the extremely accurate alignment of two surfaces relative to each other.

Aligning two surfaces relative to each other to a high degree of accuracy is a problem that is particularly troublesome in devices that require parallel surfaces for efficient operation. Such devices include telescopes, inertial guidance systems and laser cavities. Numerous optical and mechanical approaches have been tried and developed to permit accurate alignment of two or more surfaces. Unfortunately, mechanical approaches have generally failed to be sufficiently accurate for high precision devices and most optical approaches are tedious to apply.

A common optical method used to align parallel surfaces is by means of an autocollimator. Most autocollimators determine the position of a surface or body relative to the autocollimator by projecting a light beam through an optical system onto a reflecting surface. The position of the reflected beam is then observed to determine the position of the reflecting surface. If two surfaces are to be observed, each of the surfaces is observed relative to the reference body rather than to each other.

This use of an artificial reference body introduces some inaccuracies into the measurement system and increases the chance of errors being made in operation of the autocollimator. Also, if a reference body is used, it is very difficult to make real time observations of the relative positions of the observed surfaces during their operation. This is because it is impractical to interrupt operation of many devices in order to check their relative positions.

A real time autocollimator would allow periodic or even constant checks of the parallelism of structures during their operation so that drift due to thermal, vibrational or other changes can be easily corrected. This would be a significant advance, since large optical systems are sensitive to drift due to thermal and mechanical changes that may inadvertently occur during device operation. While small changes of this nature are not harmful to most machines, optical structures such as telescopes always can be greatly degraded if alignment between optical surfaces deteriorates.

In view of the above, the need exists for an easy to operate real time autocollimator capable of measuring relative tilt between two surfaces to high accuracy.

SUMMARY OF THE INVENTION

The invention comprises apparatus for measuring the relative tilt between two surfaces. The invention is a real time autocollimator that makes use of a non-polarized laser light source to supply a beam of collimated light to a series of beam splitters and detectors. Light from the laser light source passes through a non-polarized first beam splitter and to a polarized second beam splitter. The polarized second beam splitter divides the beam into a first polarized beam and a second dissimilarly polarized beam. The first polarized beam is directed to one of the two surfaces to be observed. The second polarized beam passes through the second beam splitter to a quarter wavelength plate which receives and then reflects the second polarized beam back into the second beam splitter. The second beam splitter thereupon reflects the second beam to a second surface to be observed. Light reflected from the two surfaces being observed is recombined in the second beam splitter and directed back to the the first beam splitter.

The first beam splitter directs the recombined beam through a focusing lens and into a polarized third beam splitter, which divides the focused recombined light into two dissimilarly focused beams. Two quadrant detectors are used to detect the position of the two polarized focused beams, wherein one of the beams comprises light reflected from the first surface being observed and of the other polarized beams comprises light reflected from the second surface being observed. The quadrant detectors is used to compare the position of the two focused beams in order to measure the relative tilt of the surfaces being observed.

In the preferred embodiment of the invention, the apparatus further comprises a steering mirror for nulling reflected light on the quadrant detectors in order to calibrate the autocollimator and to compare reflected light beams at the quadrant detectors. The steering mirror is interposed between the light source and the first beam splitter.

In view of the above, it is an object of this invention to provide a highly accurate real time autocollimator that is easy to use.

It is a further object of this invention to provide a real time autocollimator that does not interfere with use of the surface being observed.

BRIEF DESCRIPTION OF THE DRAWINGS

The foregoing objects and other advantages of the invention will be apparent from the following more particular description of the preferred embodiment of the invention, as illustrated in the accompanying drawing. The drawing is not necessarily to scale, emphasis instead being placed upon illustrating the principles of the invention.

The figure is a schematic representation of the real time autocollimator embodying the principles of this invention.

DETAILED DESCRIPTION OF THE INVENTION

The invention comprises an autocollimator apparatus 10 designed to measure the relative tilt between two platelike surfaces 12 and 14. Plates 12 and 14 represent two surfaces that must be aligned parallel to high accuracy. The apparatus 10 is capable of real time measurement of the relative parallelism of surfaces 12 and 14.

A non-polarized laser light source 16 is used to produce a collimated light beam that is directed to a stabilization mirror 18. The stabilization mirror 18 has piezoelectric drive mechanism for adjusting the position of the reflected beam that passes through a first beam splitter 20. The beam splitter 20 is non-polarized and allows passage of about 50% of the reflected light through to beam splitter 22.

Beam splitter 22 is a polarized device which allows one polarization state to pass through the beam splitter diagonal 22a while reflecting the other polarization state onto surface 14. Light is reflected from surface 14 and returned to the beam splitter 22, where it is reflected at diagonal 22a.

The remaining light that passes through the beam splitter diagonal 22a enters an adjacent quarter waveplate 24. The quarter waveplate 24 reflects the light from a mirrored back 24a and returns it to the beam splitter 22. The polarization state of the light has been rotated 90°, since it has made a double pass through the quarter waveplate 24. The beam is now reflected by the diagonal 22a and is transmitted to surface 12. Surface 12 is supplied with reflective panel 12a, which reflects the light back into beam splitter 22. Reflected light from surface 12 is reflected by the beam splitter diagonal 22a and sent back to the quarter waveplate 24. A double pass through the quarter waveplate rotates the polarization state 90° once more, so that this light now passes through diagonal 22a and is recombined with the dissimilarly polarized light reflected from the surface 14. The combined light now passes back into the first beam splitter 20, where about 50% of both beams is reflected to lens 26.

Lens 26 focuses the light into polarized beam splitter 28. Polarized beam splitter 28 separates out the two dissimilarly polarized beams onto quadrant detectors 30 and 32. The beams each represent the reflected light from one of the two surfaces 12 and 14. The output from quadrant detector 32 is used to drive the piezoelectric controlled steering mirror 18 until a known beam position is reached on detector 32. The output from detector 30 is then compared to provide a relative tilt measurement between the two plates. If, for example, the two plates are perfectly parallel, then the beams will be nulled on both detectors 30 and 32, after the adjustment of the steering mirror.

The null position can be defined as when a light beam is centered at the intersection of the four discrete areas that make up quadrant detectors 30 and 32. If there is any lack of parallelism between the plates, then it will be impossible to null both quadrant detectors.

It is possible to calibrate the real time autocollimator by inserting a quarter wavelength calibration plate between beam splitter 22 and surface 12. This will result in the same reflected light from surface 14 being directed to both quadrant detectors. Adjustment of steering mirror 18 should result in nulling of the signals at both photo diodes (i.e., quadrant detectors). Any discrepancies can be corrected by adjustment of micrometer screws 34 which form a part of the mountings of quadrant detectors 30 and 32. After the calibration plate is removed, the two signals will be both nulled only when the plates are parallel.

This system can operate in real time and be used to adjust the observed surfaces during operation of the particular device to which it is incorporated. The use of this autocollimator would not disrupt operations of telescopes, lasers or inertial guidance devices for which it might be required. An active correction factor may also be considered in calculations, since the parallelism of the plates can be continually determined.

While the device has been particularly described with reference to the preferred embodiment thereof, it will be understood by those skilled in the art that various changes in substance and form can be made therein without departing from the spirit and scope of the invention as defined in the appended claims.

I claim:

1. An apparatus for measuring relative tilt between two surfaces comprising:
    (a) a light source for supplying light to the apparatus;
    (b) a non-polarized first beam splitter wherein light from said light source initially passes through said first beam splitter;
    (c) a polarized second beam splitter wherein light passing through said first beam splitter is divided by said second beam splitter, one portion of the light being directed to a first of said two surfaces and a second portion of the light being directed to the second of the two surfaces, light reflected from the two surfaces being recombined and directed back through said first beam splitter;
    (d) a focusing lens for focusing recombined light directed to the focusing lens by said first beam splitter;
    (e) a polarized third beam splitter which divides the focused recombined light into two focused beams; and;
    (f) two light detectors, each for detecting one of said focused beams in order to measure the tilt of said surfaces by comparing the positions of said focused beams.

2. The apparatus for measuring relative tilt between two surfaces of claim 1 wherein said second beam splitter further comprises a quarter-wave plate so that light entering said second beam splitter is divided into a first polarized beam that is reflected onto said first surface and a second dissimilarly polarized beam that passes through said second beam splitter to be reflected by said quarter-wave plate and directed onto the second surface.

3. The apparatus for measuring relative tilt between two surfaces of claim 2 wherein light reflected by said second surface passes back through said quarter-wave plate and said second beam splitter to be recombined with light reflected by said first surface.

4. The apparatus for measuring relative tilt between two surfaces of claim 3 wherein said third beam splitter redivides light reflected by each of said surfaces and directs light reflected from the first surface onto one of said detectors and light reflected from the second surface onto the other detector.

5. The apparatus for measuring relative tilt between two surfaces of claim 4 wherein said light detectors comprise quadrant detectors.

6. The apparatus for measuring relative tilt between two surfaces of claim 1 wherein said light source comprises a non-polarized laser.

7. The apparatus for measuring relative tilt between two surfaces of claim 1 further comprising a steering mirror for nulling reflected light on said detectors in order to determine relative tilt between the two surfaces.

8. The apparatus for measuring relative tilt between two surfaces of claim 7 wherein said steering mirror is interposed between said light source and said first beam splitter.

9. The apparatus for measuring relative tilt between two surfaces of claim 4 further comprising a steering mirror for nulling reflected light on said quadrant detectors in order to determine relative tilt between the two surfaces.

10. A real time autocollimator for measuring relative tilt between two surfaces comprising:
    (a) a laser light source for supplying non-polarized light to the autocollimator;

(b) a non-polarized first beam splitter wherein light from said light source initially passes through said first beam splitter;

(c) a polarized second beam splitter wherein light passing through said first beam splitter is divided by said second beam splitter into a first polarized beam and a second dissimilarly polarized beam, said first polarized beam being directied to a first of the two surfaces;

(d) a quarter-wave plate for receiving said second dissimilarly polarized beam from said second beam splitter, said second dissimilarly polarized beam being reflected by said quarter-wave plate back through said second beam splitter which directs it onto the second surface, light reflected from the first and second surfaces being recombined by said second beam splitter and directed back through said first beam splitter;

(e) a focusing lens for focusing recombined light directed to the focusing lens by said first beam splitter;

(f) a polarized third beam splitter which divides the focused recombined light reflected from each of said surfaces into two dissimilarly polarized focused beams;

(g) two light detectors, each for detecting the position one of said focused beams wherein said third beam splitter directs light reflected from the first surface onto one of said detectors and light reflected from the second surface onto the other detector in order to measure the relative tilt of said surfaces by comparing the positions of said focused beams on said detectors.

11. The real time autocollimator of claim 10 wherein said light detectors comprise quadrant detectors.

12. The real time autocollimator of claim 10 further comprising a steering mirror for nulling reflected light on said detectors in order to determine relative tilt between the two surfaces.

13. The real time autocollimator of claim 12 wherein said steering mirror is interposed between said light source and said first beam splitter.

14. The real time autocollimator of claim 10 wherein light reflected from the second surface is directed back through the quarter-wave plate prior to recombining with light reflected from the first surface.

* * * * *